United States Patent [19]
Gebhardt et al.

[11] 3,851,738
[45] Dec. 3, 1974

[54] BRAKE SHOE FOR RAILWAY VEHICLE DISK BRAKES

[75] Inventors: Hans Gebhardt; Franz Prahl; Mathias Schorwerth, all of Munich, Germany

[73] Assignee: Knorr-Bremse GmbH, Muenchen, Germany

[22] Filed: Mar. 19, 1973

[21] Appl. No.: 342,476

[30] Foreign Application Priority Data
Mar. 17, 1972   Germany............................ 2213049

[52] U.S. Cl.............. 188/244, 188/234, 188/250 G
[51] Int. Cl............................................ F16d 65/04
[58] Field of Search .......... 188/234, 235, 242, 244, 188/245, 250 G

[56] References Cited
UNITED STATES PATENTS
18,435   10/1857   Collier............................... 188/234
947,923   2/1910   Maples................................ 188/234

FOREIGN PATENTS OR APPLICATIONS
3,990   8/1883   Great Britain..................... 188/244

Primary Examiner—George E. A. Halvosa
Attorney, Agent, or Firm—Edmund M. Jaskiewicz

[57] ABSTRACT

A disk brake for a railway vehicle has a lining support in a face of which is formed a groove into which a brake lining can be inserted. There is an opening in the support extending transversely to the groove and a latch is pivotally mounted on the support so that a locking projecton on the latch is positioned within the opening transversely across the groove in the locking position. A resilient U- or S-shaped clamp is provided to lock the free end of the latch but the clamp can be moved sufficiently to release the latch.

10 Claims, 5 Drawing Figures

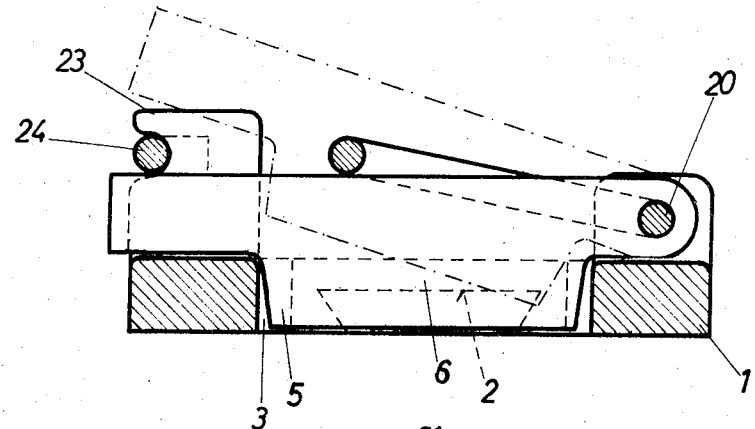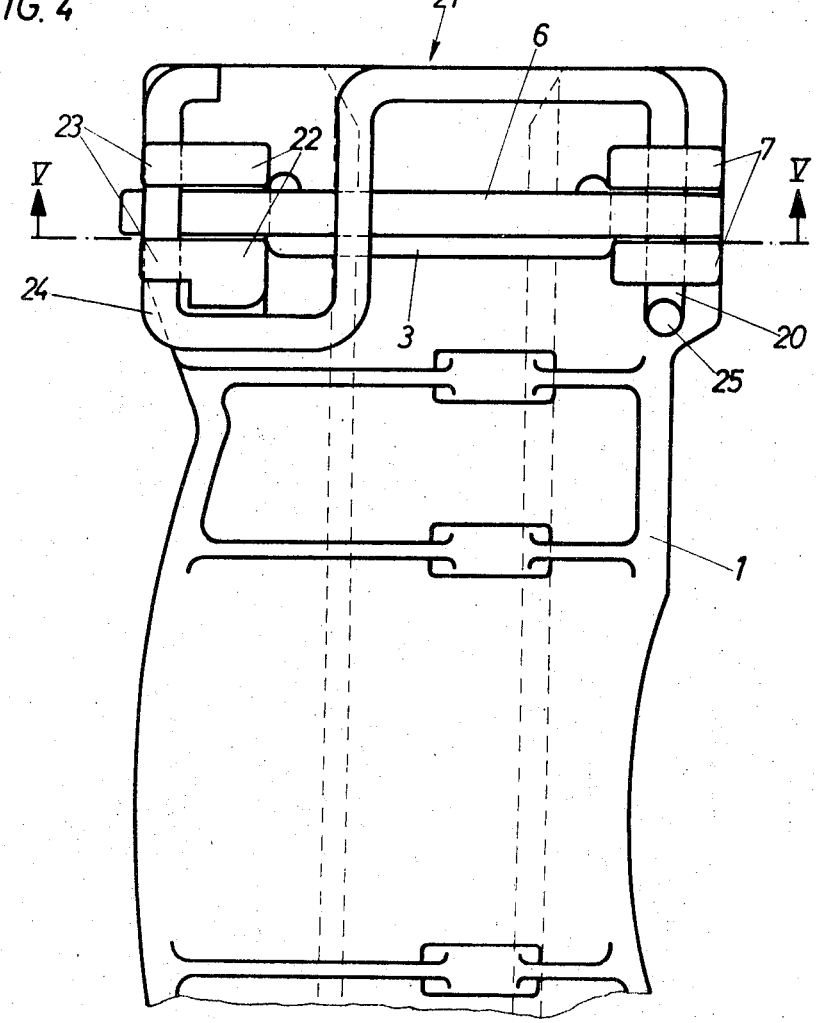

BRAKE SHOE FOR RAILWAY VEHICLE DISK BRAKES

The present invention relates to brake shoes for disk brakes of railway vehicles, more particularly, to a lock for retaining a brake lining which is insertable into a brake lining support.

Brake shoes for the disk brakes of railway vehicles have been provided with a latch pivotally mounted on the brake lining support in such a manner that the latch traverses the lining guide in which the lining is supported when the latch is in the locking position. The latch is generally pivotally mounted at an end of the brake lining support laterally to the brake lining guide in the plane of the brake lining support and may be locked in position by means of a bolt which engages the latch at or near its free end. In contrast to other locking devices such as, for example, a wedge which is driven into a recess in the lining support extending transversely to the lining guide and crossing the lining guide, the latch lock has the distinct advantage that the separate components of the lock do not become completely detached from the lining support during assembly or disassembly of the brake linings. Therefore, the components of the lock cannot become lost. However, operating experience has demonstrated that the pivot mount of the latch is strongly stressed by shocks and forces exerted by the brake lining on the latch, especially in the case of a brake lining which is retained in its guide so as to be capable of very limited displacement. These forces acting upon the latch may lead to the damage or destruction of the latch pivot mount so that the latch becomes inoperative.

A wedge lock has also been proposed wherein the wedge is secured by bolts against the possibility of getting lost and the forces exerted by the brake lining on the wedge can be transmitted to the brake lining support without causing damages to the lock. Such a lock has not been satisfactory since it required considerable labor during this assembly and insertion of the locking wedge.

It is therefore the principal object of the present invention to provide a novel and improved brake shoe for railway vehicle disk brakes. It is another object of the present invention to provide a novel and improved lock for a brake lining on the brake shoe of a disk brake for a railway vehicle.

It is a further object of the present invention to provide a lock for a brake shoe of the disk brake of a railway vehicle wherein the parts do not become detached during assembly or disassembly and wherein the latch is not subjected to forces and stresses during operation.

According to one aspect of the present invention, there is provided a lock for a brake lining that can be inserted into a brake lining support of a disk brake for a railway vehicle. A brake lining support includes a longitudinally extending lining guide means on a face thereof and there is an opening in the support extending transversely to the lining guide means. A latch is pivotally mounted at one end thereof on the support and is pivotable in a plane perpendicular to the plane of the lining support means. A locking projection on the latch is insertable into the opening and contacts the face of the opening away from the lining guide when the locking projection is positioned in the opening traversing the lining support means in the locking position. The various forces and shocks exerted by the lining against the lining projection are thus transmitted directly to the lining support since the locking projection is in contace with the edge of the opening positioned away from the lining guide. This arrangement prevents any stressing of the pivot mount of the latch. The brake shoe lock embodies a simple structure and the latch is retained on the brake lining support without the possibility of becoming separated therefrom and lost. The latch is readily pivotable to permit removal and insertion of a brake lining.

Other objects and advantages of the present invention will be apparent upon reference to the accompanying description when taken in conjunction with the following drawings, which are exemplary, wherein;

FIG. 4 is a portion of a view similar to that of FIG. 3 of a modification of the present invention; and FIG. 5 is a sectional view taken along the line V—V of FIG. 4.

Proceeding next to the drawings wherein like reference symbols indicate the same parts throughout the various views a specific embodiment and modifications of the present invention will be described in detail.

Figure 1:
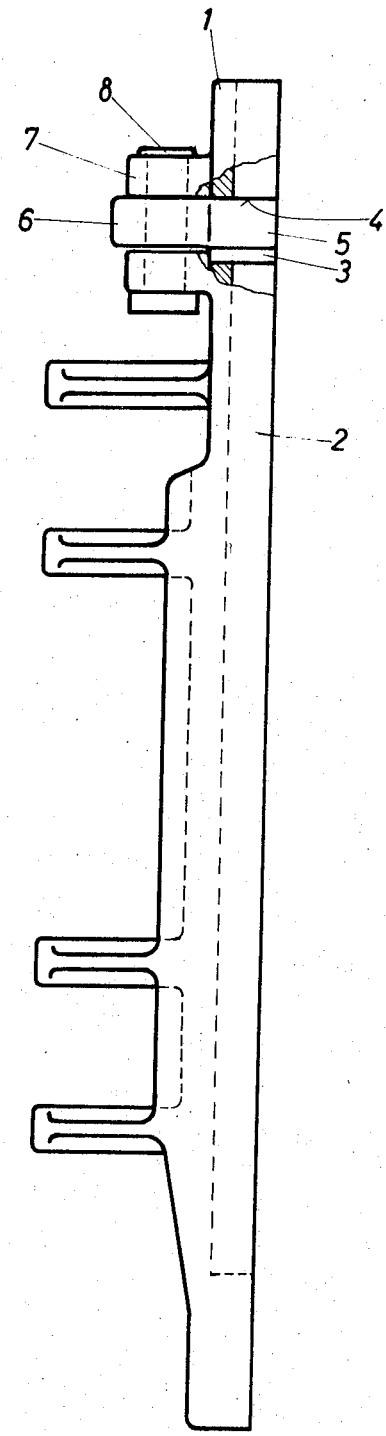
FIG. 1 is an elevational view of a brake shoe, with a portion thereof cut away, incorporating the present invention.
Figure 2:
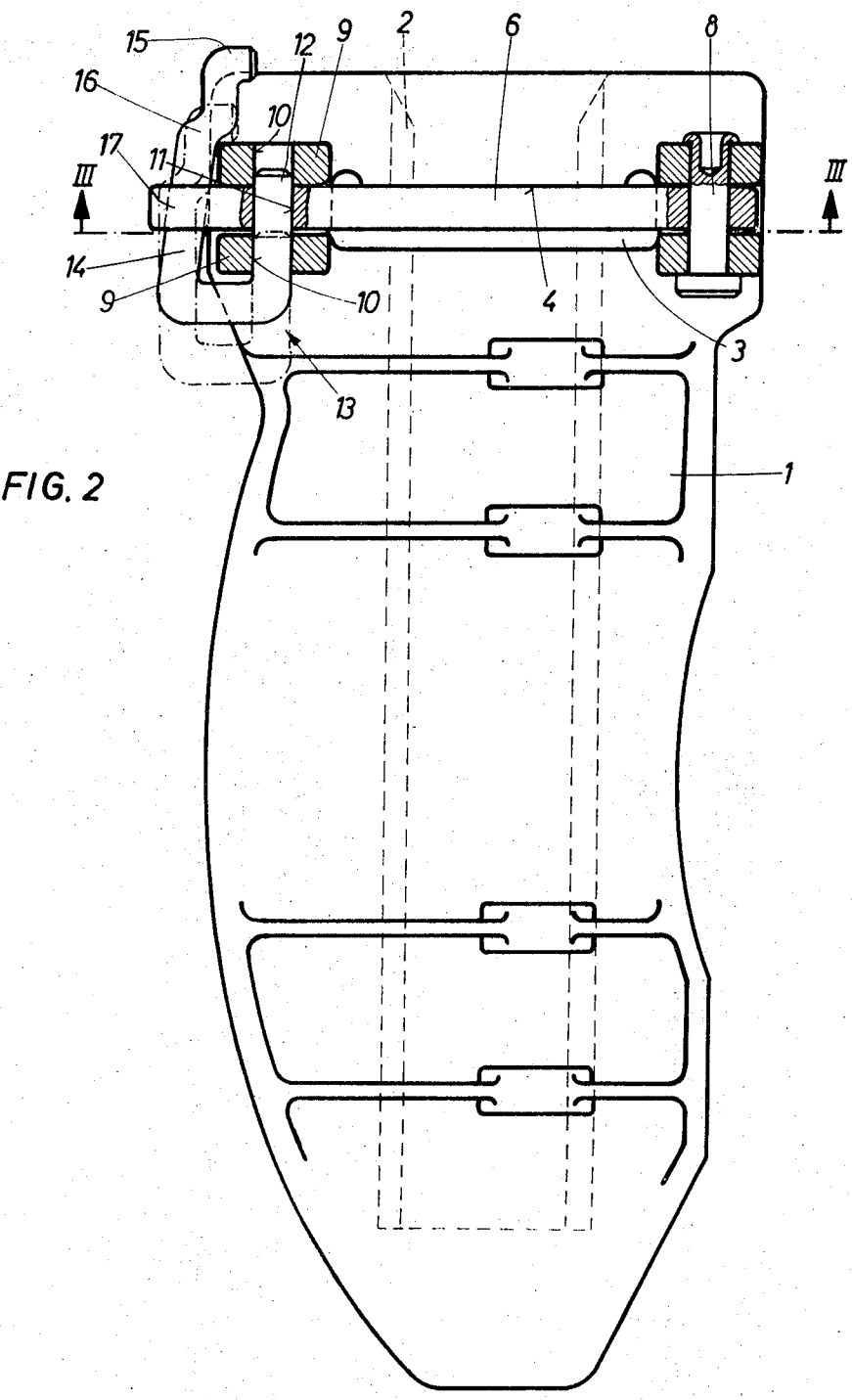
FIG. 2 is a plan view of the brake shoe of FIG. 1 with several components of the lock being shown in section.
Figure 3:
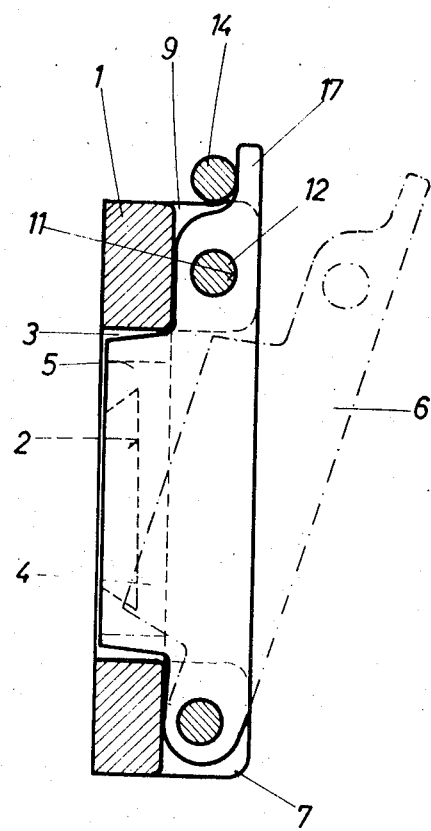
FIG. 3 is a sectional view taken along the line III—III of FIG. 2.

The brake shoe illustrated in FIGS. 1–3 comprises a brake lining support 1 having on its inner face a dovetail shaped slot 2 closed at its lower end and forming the brake lining guide into which a brake lining is inserted and retained in position. The guide 2 is open at its upper end and in the vicinity of this open end, there is provided an elongated slot or opening 3 which extends transversely to the lining guide 2 and has a length which is greater than the width of the guide 2. The opening 3 has a longitudinal edge or face 4 which is adjacent to the end of the brake lining support 1 and is machine planed to function as a contact surface for a locking projection 5 formed on the side of latch 6 which is directed toward the brake lining support 2. The latch is pivotally mounted between two vertically spaced sidebars or lugs 7 mounted on the upper portion of the lining support 1 about a pin 8 which extends in the direction of the lining guard and is secured in the lug 7. The locking projection 5 comprises an elongated extension and has a trapezoidal shape when viewed in the direction of the lining guide as can be seen in FIG. 3 and tapers inwardly in a direction away from the latch. As seen in the locked position of latch 6, the locking projection is disposed in the opening 3 in the lining guide 2 and closes or blocks this opening.

The slotted opening 3 has a length which is at least approximately equal to the width of the lining guard and preferably greater than this width. The locking projection 5 has a length which is approximately equal to the length of the slotted opening 3 and extends in the plane of pivoting of the latch on that side of the latch facing the lining support. The trapezoidal shape of the locking projection improves the strength properties and avoids core stresses in the locking projection.

In order that the latch 6 may have limited axial displacement with respect to its pivot pin 8 the space between the lugs 7 is approximately equal to the thickness of the latch 6.

In order to secure the latch 6 in the locking position as shown by the solid lines in FIG. 3, the free end of the latch which is the end remote from the pivot pin 8 projects between two locking lugs 9 which can be best seen in FIG. 2. The locking lugs 9 have aligned bores 10 therethrough which are also in alignment with a bore 11 in the latch 6 when the latch is in the locking position. An arm 12 of a substantially U-shaped clamp 13 of spring steel passes through the aligned bores 10 and 11. The clamp 13 has a second arm 14 which is engageable with the locking lugs 9 on their faces away from the latch pivot 8. The free end of arm 14 is provided with an angularly bent portion 15 which enables the clamp 13 to be displaced from its illustrated position in which the clamp secures the latch 6 in position but prevents a full release or separation of the clamp 13 from the locking lugs 9.

The arm 14 of clamp 13 is also provided with a double angularly bent portion 16, as may be seen in FIG. 2, that extends behind locking lugs 9 and which faces toward the bent portion 15 in the locking position of clamp 13. The free end of latch 6 is provided with a projection 17 which prevents an unintentional outward pivoting of clamp 13 when in the locking position. In particular, the arm 14 of clamp 13 is secured behind latch projection 17 to prevent pivoting of the clamp when in the locking position.

The bent portion 15 is at a distance from the uppermost lug 9, as viewed in FIG. 2, which corresponds to the distance necessary to slide the clamp downwardly to the dotted line position in order to enable the leg 12 of the clamp to release latch 6. This bent portion prevents any possibility of a complete separation of the clamp from the locking lugs 9 during the assembly or disassembly of the brake lining.

In the locking position of the clamp, the double bent portion 16 of arm 14 engages the rear surface of the locking lug 9 which is nearest to this bent portion.

The projection 17 on latch 6 also prevents any upward or outer turning of the arm 14 of the clamp during operation of the disk brake.

In order to remove or to mount a brake lining from or into the lining guide 2, the clamp 13 is moved into the position indicated by the dashed lines in FIG. 2 by a blow with the hammer on the bent end 15 in the direction of the lining guide. In this position, the arm 12 of clamp 13 is positioned below the latch 6 whereby the latch is released and can be swung outwardly. The swinging outwardly of the latch removes the locking projection 5 from the lining guide 2 so as to unblock the opening of the lining guide. In FIG. 3, the latch 6 is shown in dashed lines in the lifted or unblocking position. Neither the latch 6 nor the clamp 13 can become detached from the lining support 2 when the lock is open and therefore the likelihood of the loss of any of these components is avoided.

After a brake lining is inserted into the guide 2 of support 1, the latch 6 is pivoted into its locking position and is secured in this position by moving the clamp 13 back to its solid line position. This movement of the clamp may be accomplished with a blow by a hammer in the opposite direction. The brake shoe is now ready for operation. It is apparent that any forces or impact exerted by the brake lining on the latch 6 or its locking projection 5 during operation of the vehicle are absorbed directly by the machined surface 4 of the opening 3. Thus, neither the pivot 8 nor the locking lug structure 9–13 of the latch are exposed to any stresses which might possibly cause damage or destruction of the latch.

In FIGS. 4 and 5, there is illustrated a brake shoe lock wherein the locking arrangement of the latch in its locking position is somewhat different. As in the embodiment described and illustrated in FIGS. 1–3, a brake lining support 1 has an opening 3 extending transversely to the lining guide 2 and locking projection 5 of latch 6 can be positioned through the opening into the mouth of the lining guard 2 in order to block the guide. A leg 20 of a substantially S-shaped bent clamp 21 of spring steel is employed as the pivot of locking lever 6 and this leg is supported in the lugs 7. The clamp 21 is positioned over the latch 6 as may be seen in FIG. 4. On the side of the brake lining support 1 opposed from the lugs 7 there are again positioned two locking lugs 22 between which is received the free end of latch 6 when in the locking position. Each of the locking lugs 22 has a cam projection 23 directed toward the outer edge of the lining support. In order to lock the latch 6 in its locking position, arm 24 which is opposite to the pivot arm 20 of the clamp 21 engages the bottom surfaces of the projections 23 of locking lugs 22, thereby preventing pivoting of clamp 21 and any resultant release of the latch 6 into its unlocking position. When it is desired to release the lock, the arm 24 of clamp 21 is bent outwardly, such as by a screwdriver or similar tool, so that it is released out from its position under projections 23. The clamp 21 can then be freely pivoted about its leg 20 together with latch 6 to a position wherein the opening of lining guide 2 is unblocked by the locking projection 5.

The pivot arm 20 of the clamp 21 is provided with a bent portion 25 at its free end in order to prevent axial displacement of the clamp from the supporting lugs 7. This prevents any detachment of the clamp 21 and therefore any detachment of latch 6 from the lining support 1 when these components are either in the locking position or in the release position.

Thus it can be seen that the present invention has disclosed a lock for a brake lining in a disk brake which is simple in structure but effective in operation. Further, the structure of the lock prevents any detachment of its components during removal or mounting of the brake lining and thereby prevents the disappearance or loss of essential parts of the lock. Further, the structure of the lock avoids forces occurring during operation of the vehicle from impacting directly against the latch pivot support or latch locking structure. Any such forces are transmitted directly against a machined surface against which the latch and its locking projection bears when the latch is in the locking position. The lock can be easily operated with a minimum of tools but effectively retains the brake lining in position under all operating conditions.

It will be understood that this invention is susceptible to modification in order to adapt it to different usages and conditions, and accordingly, it is desired to comprehend such modifications within this invention as may fall within the scope of the appended claims.

What is claimed is:

1. In a lock for a brake lining that can be inserted into a brake lining support of a disk brake for a railway vehicle, the combination of brake lining support means including longitudinally extending lining guide means on a face thereof, there being an opening in said lining supporting means extending transversely to said lining guide means, a latch having a first and a second end portion, said latch being pivotally mounted at the first end portion thereof on said lining supporting means and pivotable into a locking latch position and in a plane perpendicular to the plane of the lining support means, a locking projection on said latch comprising an elongated extension of trapezoidal shape insertable into said opening, the entire length of said locking projection contacting a face of said opening away from said lining guide means when the locking projection is positioned in said opening to traverse said lining guide means, and locking lug means receiving the second end portion of the latch in the locking position of the latch.

2. In a lock as claimed in claim 1 wherein the length of said opening is at least the width of said lining guide means, said locking projection comprising an elongated extension on the side of said latch toward the lining support means, said locking projection having a length approximately that of the length of said opening and extending in the pivoting plane of said latch.

3. In a lock as claimed in claim 1 wherein said trapezoidal shape as viewed in the direction of the lining guide means tapers away from said latch.

4. In a lock as claimed in claim 1 and a pair of vertically spaced lugs on the face of said lining support means away from said lining guide means, pivot means for said latch mounted in said lugs, the space between said lugs being approximately the thickness of said latch so that said latch is capable of only limited axial movement.

5. In a lock as claimed in claim 1 and wherein said locking lug means comprises a pair of vertically spaced lugs on said lining support means to receive said second end portion of the latch away from the pivot end, and means on said pair of lugs for retaining said latch against pivoting movement.

6. In a lock as claimed in claim 5 wherein there are aligned openings in said pair of lugs, there being an opening in said latch aligned with said lug openings when the latch is in the locking position, said retaining means comprising a resilient U-shaped clamp having one arm passing through said lug and latch openings and another arm engageable with the outer faces of said pair of lugs, said other arm having a first bend at a distance from an end corresponding to the displacement of said one arm necessary to release said latch.

7. In a lock as claimed in claim 6 wherein said other arm has a second bend engageable in the locking position of the clamp with the lug of said pair of lugs nearest the first bent portion of the clamp.

8. In a lock as claimed in claim 6 wherein the end of said latch away from its pivot end has a projection extending over said other arm of said U-shaped clamp.

9. In a lock as claimed in claim 5 wherein said pair of lugs have holding projections thereon, said retaining means comprises an S-shaped resilient clamp having a first arm pivotally supporting said latch and a second arm engaging behind said pair of lug projections when in the locking position.

10. In a lock as claimed in claim 9 wherein the first arm has an angularly bent free end.

* * * * *